3,752,777
POLYMERS OF 2-(FLUOROPHENYL)-HEXA-
FLUORO-2-PROPYL GLYCIDYL ETHER
James R. Griffiths, River Heights, Md., assignor to the
United States of America as represented by the Secretary of the Navy
No Drawing. Filed Apr. 9, 1971, Ser. No. 132,829
Int. Cl. C08g 23/02, 23/14
U.S. Cl. 260—2 A                  8 Claims

ABSTRACT OF THE DISCLOSURE

Polymers useful for forming hydrophobic films or coatings, said polymers containing recurring units of the formula:

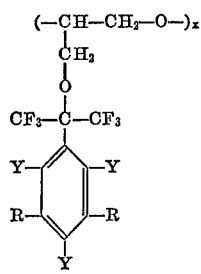

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

This invention relates to epoxide polymers. More specifically, it refers to fluorophenyl-hexafluoro-2-propyl glycidyl ether polymers useful for forming hydrophobic films or coatings.

BACKGROUND OF THE INVENTION

In my assignee's commonly owned application Ser. No. 112,826, filed Feb. 4, 1971, now Pat. No. 3,707,483, patented Dec. 26, 1972, a new class of monoglycidyl ethers was disclosed. Such ethers are useful as viscosity modifiers of fluorinated epoxy resins. An article by E. J. Vandenberg in Journal of Polymer Science; Part A–1, vol. 7, pp. 525–567 (1969) entitled, Epoxide Polymers: Synthesis, Stereochemistry, Structure, and Mechanism teaches various techniques for polymerizing epoxide compounds.

THE INVENTION

I have now discovered that by the novel process set forth below the epoxide compounds of U.S. patent application, Ser. No. 112,826, filed Feb. 4, 1971, can be polymerized into high molecular weight polymers exhibiting oleophobic and hydrophobic properties making them useful as water repellent films, lubrication barrier films, sealants, and coating. Additionally, such materials may be useful as transparent windows and canopies for ships and aircraft. By using such materials, visibility under heavy rain conditions may be greatly enhanced.

The novel polymers are described by recurring units having the formula:

(1) 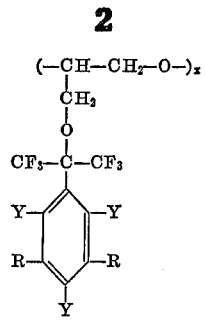

wherein $x$ is a whole number more than 2;
Y is hydrogen or when R is fluorine it is also fluorine;
R is hydrogen, fluorine or trifluoromethyl, with the limitation that when one R is trifluoromethyl the other is limited to trifluoromethyl or hydrogen.

Preferred are the homopolymers prepared from the above recurring units. However, other known monomers can be inserted into the chain by known techniques to make copolymers having modified physical properties.

High molecular weight polymers are also preferred because of their toughness. Such high molecular weight polymers will have in the polymer chain at least 25 recurring units as set forth above.

The polymers of my invention are prepared from the monomers described in U.S. patent application, Ser. No. 112,826, filed Feb. 4, 1971. The disclosure of that application is herein incorporated by reference.

The indicated starting monomers have the formula:

(2) 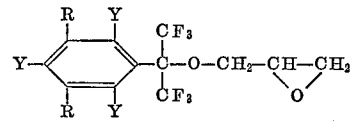

wherein R and Y have the same meaning as in Formula 1 above.

In preparing the polymer of my invention about 2 grams of a monomer of Formula 2 is reacted in the presence of 1 to 2 ml. of a catalyst. This catalyst is a 25% solution of triethyl aluminum in n-heptane diluted with absolute ethyl ether in a 0.5 M concentration. The catalyst is prepared in a stirred flask under nitrogen. Water is added dropwise to the triethylaluminum under nitrogen during a two hour period while stirring at reflux. The catalyst is a clear solution. Hexafluoroxylene, 5 to 10 ml., is used as a solvent for the reaction.

The following additional examples set forth the invention in still greater detail. All percents are by weight unless otherwise indicated.

EXAMPLE 1

Three grams of 2 - (pentafluorophenyl)hexafluoro - 2-propyl glycidyl ether and 8 ml. of hexafluoroxylene are placed into a 25 ml. "Bantamware," singlenecked glass flask fitted with a rubber septum, a magnetic stirrer and outgassed with dry nitrogen. One and one-half ml.

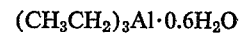

solution is prepared according to Vandenberg, General Polymer Science, Part A–1, vol. 7, p. 528 (1969), with the modification that 10% triethylaluminum in n-heptane was used instead of 25%. This catalyst is added to the reactants and stirring begun at room temperature. After five minutes of reaction there is a substantial apparent viscosity, increase in the reaction solution. After one hour of reaction time during which a magnetic stirrer is used to stir the reactants, it is found the stirring ceases due to the viscous nature of the reaction mixture. Three ml. of anhydrous methanol is injected and stirring is resumed for one-half hour, during which time the polymer congealed. The reaction flask contents are then poured into 100 ml. of n-heptane. It is noted that the polymer is insoluble in this solution. After one and one-half hours stirring, the n-heptane is removed by decantation and 15 ml. of 3% hydrochloric acid is added and the two phase mixture is stirred for an additional hour. The liquid phases are removed and discarded and replaced with 100 ml. of water and thereafter stirred for an additional one and one-half hours. This latter procedure is repeated twice. After water removal the tough gum product is dried in an air steam overnight. The yield is 2.1 grams. Inherent viscosity in hexafluoroxylene at 38° C. is 1.4185.

EXAMPLE II 4.94 grams of 2-(3-trifluoromethylphenyl)hexafluoro-2-propyl glycidyl ether are placed in a 25 ml. septum capped nitrogen purged "Bantamware" flask equipped with a magnetic stirrer. There is also added 8 ml. of hexafluoroxylene, 2 ml. of $(CH_3CH_2)_3Al \cdot 0.6H_2O$ catalyst (same as Example I) in n-hexane and ethyl ether. The polymerization is commenced at ambient temperature. Within 15 minutes reaction time a large viscosity increase occurs. After 25 minutes reaction time the solution is no longer stirrable. After a total of three hours of reaction the gelatinous solution is injected with 5 ml. of anhydrous methanol and stirring resumed with a mass of white polymer in suspension. After 30 minutes the flask contents are poured into 100 ml. of n-heptane and stirred for 30 minutes and 50 ml. of 3% hydrochloric acid is added. Stirring is continued for 20 minutes. Soluble polymer is then separated. The n-heptane solution is separated from the HCl solution and is washed twice with water. The solid polymer is allowed to dry overnight at ambient temperature. Yield 3.45 grams. Inherent viscosity in hexafluoroxylene at 38° C. is 2.87. From the n-heptane solution, 1.52 grams of monomer is recovered.

EXAMPLE III

Like amount by weight of 2[3,5-di(trifluoromethyl)phenyl] hexafluoro-2-propyl glycidyl ether is substituted for the 2-(3-trifluoromethylphenyl)hexafluoro-2-propyl glycidyl ether of Example II. The same steps are carried out. Approximately 3.0 grams are obtained of a solid white polymer. This homopolymer has a melting point of 165° C. Inherent viscosity is 1.974 at 38° C. in hexafluoroxylene.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A polymer consisting essentially of recurring units of the formula:

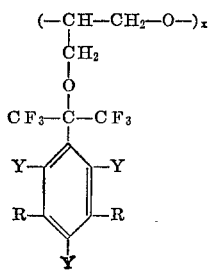

wherein $x$ is a whole number more than 2;
Y is hydrogen or when R is fluorine, it is also fluorine; and
R is hydrogen, fluorine or trifluoromethyl with the limitation that when one R is trifluoromethyl the other R is limited to trifluoromethyl or hydrogen.

2. A polymer according to claim 1, wherein all of R and Y are fluorine.
3. A polymer according to claim 1, wherein all the Y's are hydrogen and one R is trifluoromethyl and the other is hydrogen.
4. A polymer according to claim 1, wherein all the Y's are hydrogen and both R's are trifluoromethyl.
5. A homopolymer according to claim 1.
6. A polymer according to claim 1, wherein $x$ is at least 25.
7. A process for the preparation of a polymer comprising recurring units of the formula:

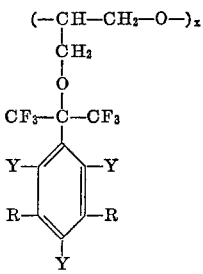

wherein $x$ is a whole number more than 2;
Y is hydrogen or when R is fluorine, it is also fluorine; and
R is hydrogen, fluorine or trifluoromethyl with the limitation that when one R is trifluoromethyl the other R is limited to trifluoromethyl or hydrogen;

said process comprising reacting a compound of the formula:

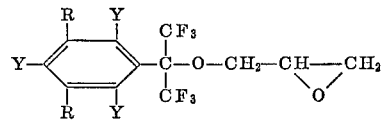

wherein R and Y have the same meaning as above, in the presence of a catalytic amount of triethylaluminum and hexafluoroxylene solvent in a nitrogen atmosphere.

8. A process according to claim 7, wherein for each one mole of triethylaluminum there is present about 0.6 mole of water in the presence of hexafluoroxylene solvent.

References Cited

UNITED STATES PATENTS 3,361,685  1/1968  Pittman et al. _____ 260—2
3,660,615  5/1972  Hill et al. _____ 260—2

OTHER REFERENCES

Chem. Abstracts 52, 9062e (1958).
Chem. Abstracts 71, 38789t (1969).

WILLIAM H. SHORT, Primary Examiner
E. A. NIELSEN, Assistant Examiner

U.S. Cl. X.R.
260—615 BF